Oct. 27, 1931.   P. B. TOWNLEY ET AL   1,829,689
METHOD OF COLORING EGGS OR THE LIKE
Filed Nov. 15, 1930
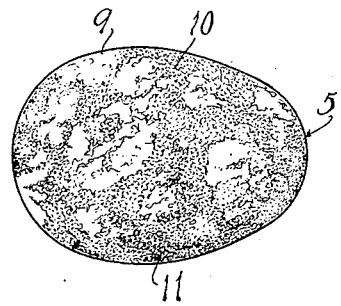
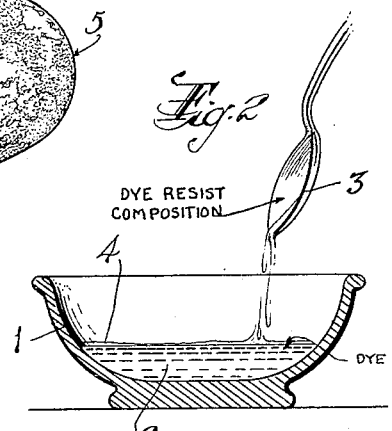
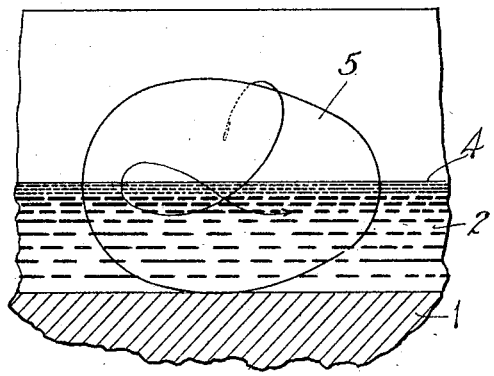
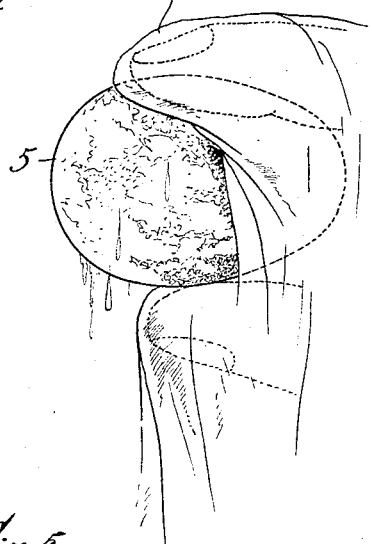
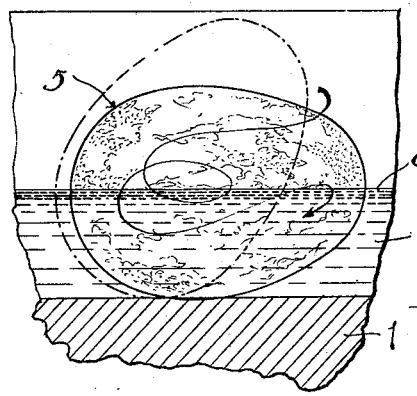

Patented Oct. 27, 1931

1,829,689

UNITED STATES PATENT OFFICE

PHILIP B. TOWNLEY, OF RUMSON, AND WILLIAM R. TOWNLEY, OF EAST ORANGE, NEW JERSEY, ASSIGNORS TO PAAS DYE COMPANY, A CORPORATION OF NEW JERSEY

METHOD OF COLORING EGGS OR THE LIKE

Application filed November 15, 1930. Serial No. 495,898.

This invention relates to a method or process of coloring eggs or the like to produce marbleized effects, and more particularly the invention is directed to a method of this character wherein the egg or the like is treated by the simple immersion and rolling of the egg in a liquid preparation so that a dye or coloring substance takes effect upon the certain portions of the egg while other portions are unaffected by the coloring substance.

One object of the invention is to provide a novel and improved method of the character described, consisting in immersing and rolling the egg or the like in a preparation comprising a body of liquid coloring material having a layer of liquid or semi-liquid material upon its surface which, as the egg or the like is immersed, will adhere to and coat certain portions of the egg and prevent the coloring substance from coloring said certain portions, so as to produce a marble-like effect upon the egg.

Other objects are to provide a method of the character described consisting in placing a quantity of a solution of preferably water soluble dye or coloring matter in a receptacle, placing therein a liquid or a melted solid or semi-solid, resist substance immiscible with and lighter than said solution, such as olive oil or melted oily or greasy substances, for example, hydrogenized cotton seed oil, lard or butter, so that said resist substance forms in a layer upon the surface of said solution of dye or coloring matter and the depth of the preparation thus formed is less than the diameter of the egg or the like, then immersing and rolling an egg or the like in said preparation, and thereafter wiping dry the egg or the like; and to obtain other advantages and results as will be brought out by the following description.

Referring to the accompanying drawings in which corresponding and like parts are designated throughout the several views by the same reference characters, Figure 1 is a side elevation of an egg dyed in accordance with our invention.

Figure 2 is a composite view including a receptacle in section and a spoon showing the manner of making our preparation for dyeing eggs.

Figure 3 is an enlarged fragmentary transverse vertical sectional view through the receptacle having the preparation therein and showing the manner of manipulating an egg in the preparation.

Figure 4 is a perspective view illustrating the step of wiping the egg after its immersion in the preparation, and Figure 5 is a view similar to Figure 3 showing the treatment of the egg with a second preparation.

Specifically describing the invention, we may utilize any suitable known dye or coloring solution, containing either an aniline or vegetable dye, for example, any of the usual commercial Easter egg dyes including water soluble dye or coloring substances. This solution is preferably heated and placed in a receptacle, for example, a shallow bowl or deep saucer, so that the depth of the solution will about half cover an egg immersed therein. In Figure 2 of the drawings the receptacle is designated 1, while the dye or coloring solution is designated 2.

To this dye or coloring solution is added about a half teaspoonful of a suitable resist substance which will adhere to an egg and repel the coloring solution or prevent the coloring solution from taking effect upon the egg. This resist substance may consist of an oily or greasy material, such as a vegetable oil, or a mineral oil, or an animal oil, or fat, preferably immiscible with and lighter than the dye or coloring solution so as to form a layer upon the surface of the dye or coloring solution. Preferably the quantity of resist substance is such that said substance does not entirely cover the coloring liquid, but concentrates in a patch or patches. We have found olive oil, cotton seed oil, and linseed oil, as well as lard and butter to be satisfactory. Where the substance is hard or congealed, for example, as lard or butter or a fat, the substance is preferably melted to produce a liquid or semi-liquid which may be poured directly from a spoon 3 or the like upon the surface of the dye solution 2. In Figure 2 of the drawings the resist substance is designated 4.

After the preparation has been thus completed an egg 5 or other object to be colored, is immersed in the preparation and moved or rolled about with a spoon or the like, as shown in Figure 3 of the drawings where the arrow indicates the direction of movement of the egg. During this immersion and manipulation of the egg, some of the resist substance adheres to certain portions of the egg and repels the dye or coloring solution so as to prevent the solution from taking effect upon or coloring the egg at said certain portions, while other portions of the egg are dyed or colored in the usual way. Preferably the egg is dry and hot when it is immersed in the preparation, although such is not necessary. After the egg has been so manipulated it is removed from the preparation and wiped dry with any suitable material 6 as shown in Figure 4 of the drawings. The egg then has a marble-like appearance, being uncolored where the resist substance has adhered to the shell, and having colored spots or areas where the resist substance has not adhered. The color of the spots or areas will depend upon the color of the dye or coloring solution.

If desired, the egg may then be similarly immersed and manipulated in preparations having dye or coloring solutions of other colors, the resist substance being placed upon the surface of the dye or coloring solution as above described. In Figure 5 of the drawings, the egg 5 is shown as being treated in a second preparation which includes the dye or coloring solution 7 and a layer of resist substance 8 on the surface of the coloring solution. The egg is preferably wiped dry after immersion in each of the preparations.

By varying the duration of the immersion and manipulation of the egg in the preparation, different color effects may be secured, and obviously many different color effects may be obtained by immersing the egg in two or more preparations including dye or coloring solutions of different colors.

An egg completely colored in accordance with our invention is shown in Figure 1 of the drawings, having certain portions 9 of one color, other portions 10 of another color, and other portions 11 of different shades caused by overlapping of different colors. The shapes of the various portions 9, 10 and 11 are irregular and different so as to produce a vari-colored marble-like effect.

It is an important feature of our invention that the preparation be of such depth as to only partially cover an egg, and that the resist substance be in as thin liquid form as possible. This results in a fine mottling or marble-like effect upon the egg with the colors nicely blended.

As above indicated, various dyes or coloring solutions may be utilized, and many different resist substances may be used in making our preparation and carrying out the method. One especially satisfactory resist substance is a well-known commercial food composition consisting of hydrogenized vegetable oil, for example, cotton seed oil.

Having thus described our invention, what we claim is:

1. The method of coloring an egg consisting in immersing the egg to be colored in a preparation consisting of a coloring liquid including a coloring material dissolved in water and having a layer of a substance on its surface which will adhere to the egg and repel said liquid, so that the egg is only partially submerged in the preparation and said substance adheres to portions of the egg and prevents contact of said coloring liquid with said portions of the egg while the color takes effect upon the other portions of the egg, and then wiping dry the egg.

2. The method set forth in claim 1 with the additional step of turning and bodily moving said egg in said preparation before wiping dry the egg.

3. The method set forth in claim 1 wherein said substance is a liquid oily material.

4. The method of coloring an egg consisting in placing a coloring liquid in a receptacle, placing upon the surface of said liquid a layer of oily liquid substance immiscible with and lighter than said coloring liquid and which will adhere to portions of the egg, so that the preparation thus formed is of a depth less than the diameter of the egg, immersing and turning an egg to be colored in the preparation thus formed, and wiping dry the egg.

5. The method set forth in claim 1 wherein said substance is a vegetable oil.

PHILIP B. TOWNLEY.
WILLIAM R. TOWNLEY.